United States Patent [19]
Kim et al.

[11] Patent Number: 5,339,181
[45] Date of Patent: Aug. 16, 1994

[54] LIQUID CRYSTAL DISPLAY COMPRISING A STORAGE CAPACITOR INCLUDING THE CLOSED-ENDED ELECTRODE FOR PROVIDING A CURRENT BATH FOR CIRCUMVENTING BREAK

[75] Inventors: Sang-soo Kim, Seoul; In-sik Jang, Suwon; Nam-deog Kim; Jeong-ha Son, both of Songpa, all of Rep. of Korea

[73] Assignee: Samsung Electronics Co., Ltd., Kyungki, Rep. of Korea

[21] Appl. No.: 934,396

[22] Filed: Aug. 25, 1992

[30] Foreign Application Priority Data

Sep. 5, 1991 [KR] Rep. of Korea .................... 91-15530

[51] Int. Cl.⁵ .......................................... G02F 1/1335
[52] U.S. Cl. ........................................ 359/59; 359/54; 359/67
[58] Field of Search .................. 359/54, 59, 67; 340/784, 719

[56] References Cited

U.S. PATENT DOCUMENTS

5,028,122  7/1991  Hamada ............................ 359/59
5,193,017  3/1993  Iwai et al. ........................ 359/67

*Primary Examiner*—William L. Sikes
*Assistant Examiner*—Huy Mai
*Attorney, Agent, or Firm*—Robert A. Westerlund; Stephen R. Whitt; Charles R. Dobohoe

[57] ABSTRACT

An active matrix LCD which essentially differs from presently available active matrix LCDs in that the layout of a first electrode of a storage capacitor associated with each pixel thereof is modified in such a manner as to significantly increase the aperture and contrast ratios thereof relative to those of presently available active matrix LCDs. More particularly, the first electrodes of the storage capacitors are laid out in such a manner as to substantially surround their associated pixel electrodes, and preferably, only overlap a marginal edge portion of their associated pixel electrodes, about the periphery thereof.

13 Claims, 4 Drawing Sheets

LIQUID CRYSTAL DISPLAY COMPRISING A STORAGE CAPACITOR INCLUDING THE CLOSED-ENDED ELECTRODE FOR PROVIDING A CURRENT BATH FOR CIRCUMVENTING BREAK

BACKGROUND OF THE INVENTION

The present invention relates generally to a liquid crystal display (LCD), and more particularly, to an improved active matrix LCD.

In response to a rapidly increasing demand for space-saving, personalized displays which serve as the primary information transmission interface between humans and computers (and other types of computerized devices), various types of flat screen or flat panel displays have been developed to replace conventional display devices, particularly CRTs, which are relatively large, bulky, and obtrusive. Among the most attractive of these flat panel displays are LCDs, which, in some forms, match or surpass the color picture quality of CRTs. In particular, an LCD in an active matrix form utilizes a combination of liquid crystal technology and semiconductor technology, and is recognized as being superior to CRT displays.

The active matrix LCDs utilize an active device having a non-linear characteristic for driving each of a multiplicity of pixels arranged in a matrix configuration, to thereby provide both a memory function and an electronic optical effect of a liquid crystal. A thin film transistor (TFT) is ordinarily used as the active device. In an active matrix LCD which utilizes such active devices, millions or even billions of TFTs are integrated on a glass substrate together with a pixel address wiring pattern, to thereby provide an active matrix driver circuit, with the TFTs serving as switching elements. In such an active matrix LCD, the aperture ratio of the individual pixels is disadvantageously decreased, thereby concomitantly reducing the brightness of the LCD.

In order to overcome the above-described disadvantage, there has been proposed an improved active matrix LCD provided with an additional light shield layer, as described in an article entitled "High-Resolution 10.3-in.-Diagonal Multicolor TFT-LCD," by M. Tsunrura, M. Kitajima, K. Funahata, Y. Wakir, R. Saito, Y. Mikami, Y. Nagal, and T. Tsukada, in SID 91 DIGEST, pp. 215-218, published by Hitachi. In the improved active matrix LCD according to the above paper, a double light shield layer structure is employed in order to obtain a high aperture ratio and a high contrast ratio, thereby enhancing the visual display characteristics of the LCD. The double light shield layer structure includes a first light shield layer formed on a front glass substrate on which a conventional color filter is provided, and a second light shield layer formed on a rear glass substrate on which the TFTs are provided. An LCD having such a double light shield layer structure exhibits an aperture ratio which is improved by 6%-20% relative to an LCD which has only the conventional first light shield layer.

However, a significant drawback of the above-described LCD having a double light shield layer structure is that an opaque metal is used to form one of the electrodes of a storage capacitor associated with each pixel, thereby excluding the area occupied by each storage capacitor from the aperture area of its associated pixel, which has the effect of reducing the aperture ratio. Moreover, the process for fabricating the second light shield layer entails installing a light shield layer before forming an insulating layer merely for shielding light during the manufacturing of the TFTs, thereby necessitating additional process steps which unduly increase the cost and complexity of the LCD manufacturing process.

As is evident from the foregoing, there presently exists a need for an active matrix LCD which overcomes the above-described drawbacks and shortcomings of presently available active matrix LCDs. The present invention fulfills this need.

SUMMARY OF THE INVENTION

The present invention encompasses a liquid crystal display having front and rear glass substrates arranged in parallel, spaced-apart relationship to each other, with a multiplicity of rows of scanning signal electrodes and columns of display signal electrodes arranged in a matrix configuration on the inboard surface of the rear glass substrate, to thereby define a matrix of pixel regions. A pixel electrode, a switching element, and a storage capacitor are provided in each pixel region. The switching element is connected between a respective one of the display signal electrodes and a respective one of the pixel electrodes.

A primary aspect of the present invention resides in a novel layout design for the first electrode of each storage capacitor, wherein the first electrode of each storage capacitor is disposed in substantially surrounding relationship to a respective one of the pixel electrodes, and, preferably, in overlapping relationship with a marginal edge portion of the respective one of the pixel electrodes, around the periphery thereof.

A black matrix light shield layer is disposed on the inboard surface of the front glass substrate. The black matrix light shield layer is patterned in such a manner as to define a matrix of light transmissive apertures aligned with the matrix of pixel regions. A color filter layer is also disposed on the inboard surface of the front glass substrate in overlying relationship to the black matrix light shield layer, the color filter layer including light transmissive portions overlying the light transmissive apertures. A transparent electrode is disposed over the color filter layer, and a thin film or layer of liquid crystal is sandwiched between the front glass substrate and the rear glass substrate.

A first protective layer is preferably interposed between the color filter layer and the transparent electrode, and a second protective layer is preferably disposed in overlying relation to the entire inboard surface of the rear glass substrate, with the liquid crystal layer being disposed in contact with the second protective layer and the transparent electrode. Each of the switching elements is preferably located adjacent a corner of a respective one of the pixel regions, the corner being defined by the intersection of a respective one of the display signal electrodes with a respective one of the scanning signal electrodes. The first electrode of each storage capacitor and each scanning signal electrode are preferably part of a common patterned opaque metal layer formed on the inboard surface of the rear glass substrate. The switching elements are preferably TFTs each having a gate electrode which is also part of the common patterned opaque metal layer.

BRIEF DESCRIPTION OF THE DRAWINGS

The above and various other features and advantages of the present invention may be more readily understood by reference to the following detailed description taken in conjunction with the accompanying drawings, wherein like reference numerals designate like structural elements, and in which.

DETAILED DESCRIPTION OF THE INVENTION

Figure 1A:
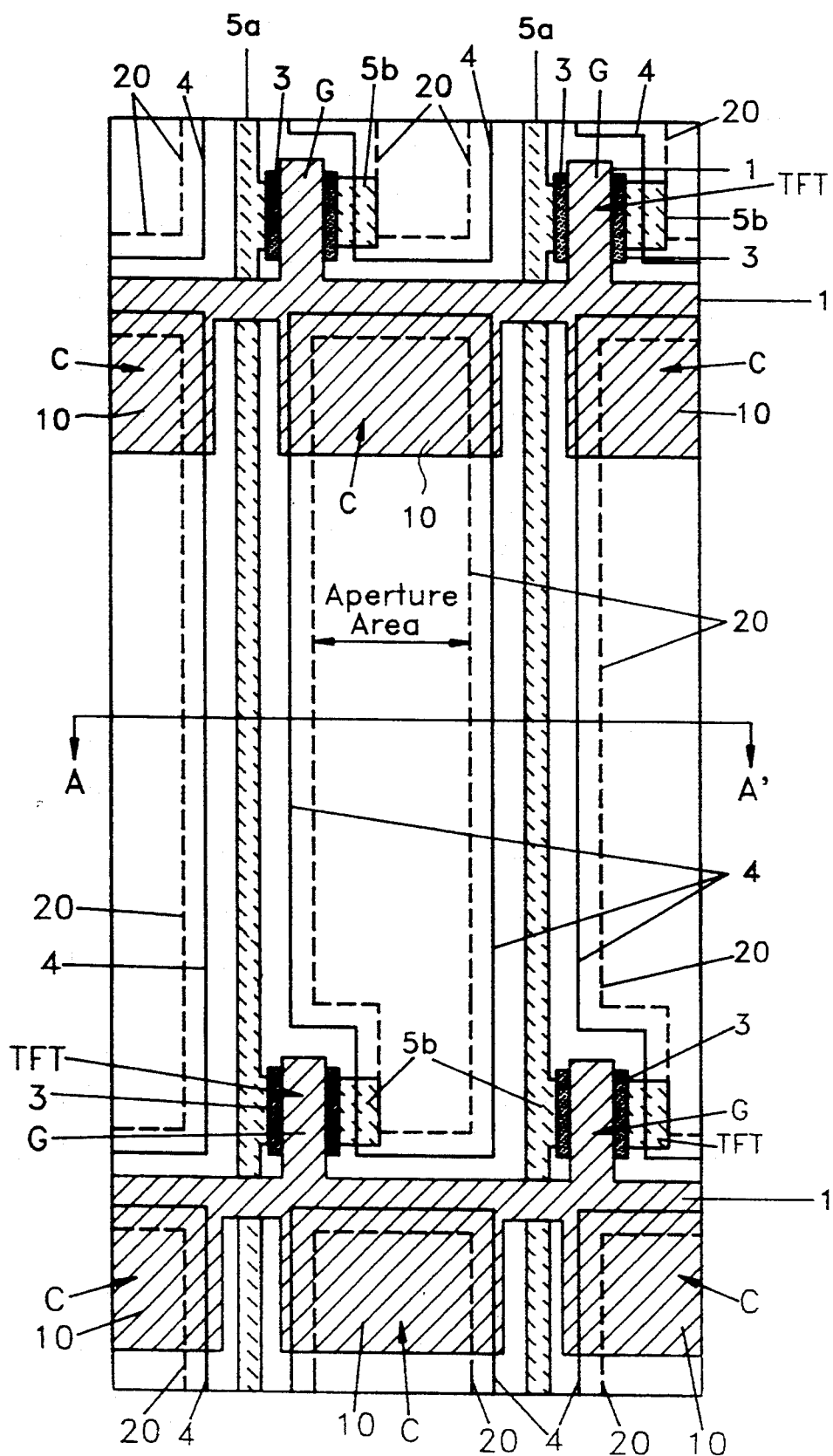
FIG. 1A is a fragmentary plan view of a prior art additional capacitor-type active matrix LCD.
Figure 1B:
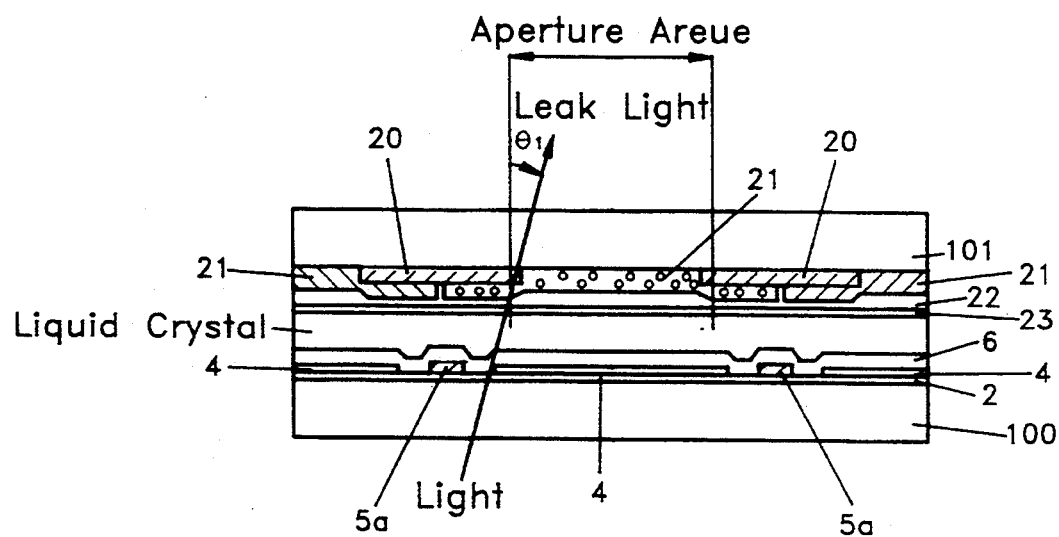
FIG. 1B is a cross-sectional view taken along the line A-A' of FIG. 1A.

With reference now to FIGS. 1A and 1B, there can be seen, respectively, plan and cross-sectional, fragmentary views of a prior art additional capacitor-type active matrix LCD. Although only a single pixel region (and portions of adjoining areas) of the prior art active matrix LCD is illustrated in FIGS. 1A and 1B, as can be readily appreciated by those of ordinary skill in the pertinent art, the LCD, in its complete form, includes a multiplicity of rows of scanning signal electrodes 1 and orthogonal columns of display signal electrodes 5a arranged in a matrix configuration, to define a corresponding matrix of pixels in the regions bounded by two adjacent rows of scanning signal electrodes 1 and two adjacent columns of display signal electrodes 5a. A storage capacitor C and a switching element, such as a TFT, are provided in each pixel region.

As can be seen in FIG. 1A, the first electrode 10 of each storage capacitor C is formed as an integral tab-like portion of a respective one of the scanning signal electrodes 1. Similarly, the gate electrode G of each TFT is formed as an integral tab-like portion of a respective one of the scanning signal electrodes 1. Further, the source electrode 5b of each TFT is formed as an integral tab-like portion of a respective one of the display signal electrodes 5a, with a semiconductor layer 3 being provided between the gate electrode G and the source electrode 5b of each TFT. A transparent pixel electrode 4 is also provided in each pixel region.

All of the scanning signal electrodes 1, display signal electrodes 5a, capacitors C, TFTs, and pixel electrodes 4 are formed as part of a multilayer structure formed on the inboard surface of a rear glass substrate 100, as can be seen in FIG. 1B. More particularly, the first electrode 10 of each storage capacitor C and each scanning signal electrode 1 are simultaneously formed by appropriately patterning (e.g., by a conventional photolithographic process) an opaque metal layer, e.g., made of aluminum (Al) chromium (Cr), molybdenum (Mo) or tantalum (Ta), deposited on the inboard surface of the rear glass substrate 100. Thereafter, an insulating layer 2 is formed over the electrodes 1 and 10 and the exposed regions of the inboard surface of the rear glass substrate 100. Next, the display signal electrodes 5a and the transparent pixel electrodes 4 are separately formed, e.g., by successive photolithographic processes. Then, a protective layer 6 is formed over the electrodes 4 and 5a and the exposed regions of the insulating layer 2, to thereby complete the multilayer structure provided on the inboard surface of the rear glass substrate 100.

With particular reference to FIG. 1B, the prior art active matrix LCD further includes a front glass substrate 101 having a multilayer structure formed on the inboard surface thereof, and oriented parallel to the rear glass substrate 100. More particularly, black matrix light shield layer 20 is formed on the inboard surface of the front glass substrate 101. The black matrix light shield layer 20 is appropriately patterned, e.g., by a standard photolithographic process, to define a matrix of windows, or Aperture Areas, aligned with and parallel to the matrix of pixel electrodes 4 disposed on the rear glass substrate 100. Thereafter, a color filter layer 21 is formed over the black matrix light shield layer 20 and the exposed areas of the inboard surface of the front glass substrate 101. The color filter layer 21 includes light transmissive portions 21a disposed in the Aperture Areas. Next, a protective layer 22 is formed over the color filter layer 21. Then, a transparent electrode 23 is formed over the protective layer 22, to thereby complete the multilayer structure provided on the inboard surface of the front glass substrate 101.

With continuing reference to FIG. 1B, it can be seen that the prior art active matrix LCD further includes a thin film of liquid crystal sandwiched between the front glass substrate 101 and the rear glass substrate 100, and disposed in contact with the transparent electrode 23 and the protective layer 6. Subsequent process steps well-known to those of ordinary skill in the pertinent art are then carried out to secure the substrates 100 and 101 in a fixed relationship and to hermetically seal the light crystal within the cavity formed therebetween.

Based upon the foregoing description of the prior art active matrix LCD, it can now be appreciated that it suffers from the following drawbacks. More particularly, since the first electrode 10 of each storage capacitor C is made of an opaque metal, and further, since the first electrode 10 of each storage capacitor C overlaps a significant portion of its associated pixel electrode 4, the Aperture Area of each pixel is significantly reduced, thereby reducing the aperture ratio thereof. Moreover, since the display signal and pixel electrodes, 5a and 4, respectively, are formed on the same insulating layer 2, they must be separated by a predetermined distance in order to achieve sufficient electrical isolation therebetween, thus lowering the contrast ratio of the LCD.

Figure 2B:
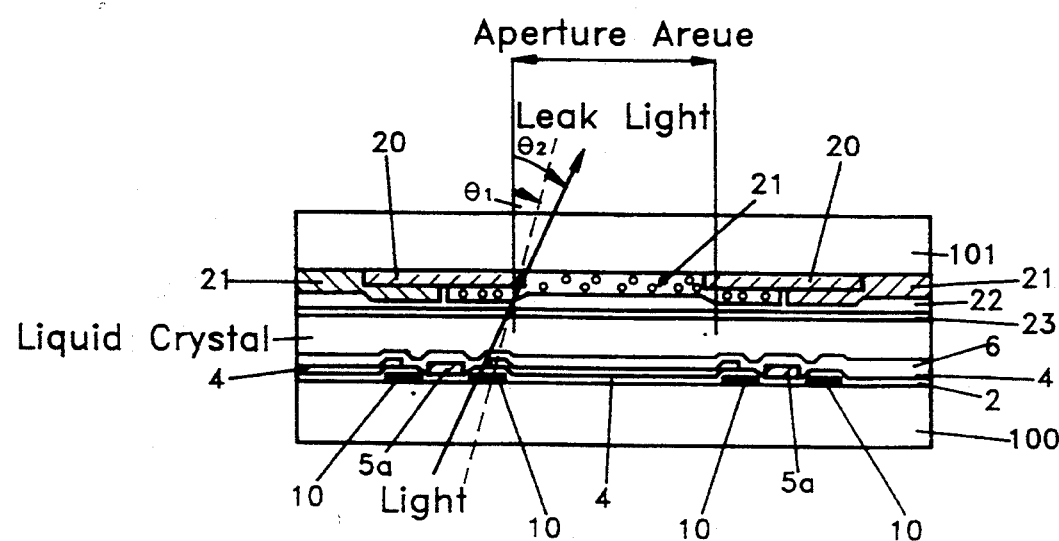
FIG. 2B is a cross-sectional view taken along line A-A' of FIG. 2A.
Figure 2A:
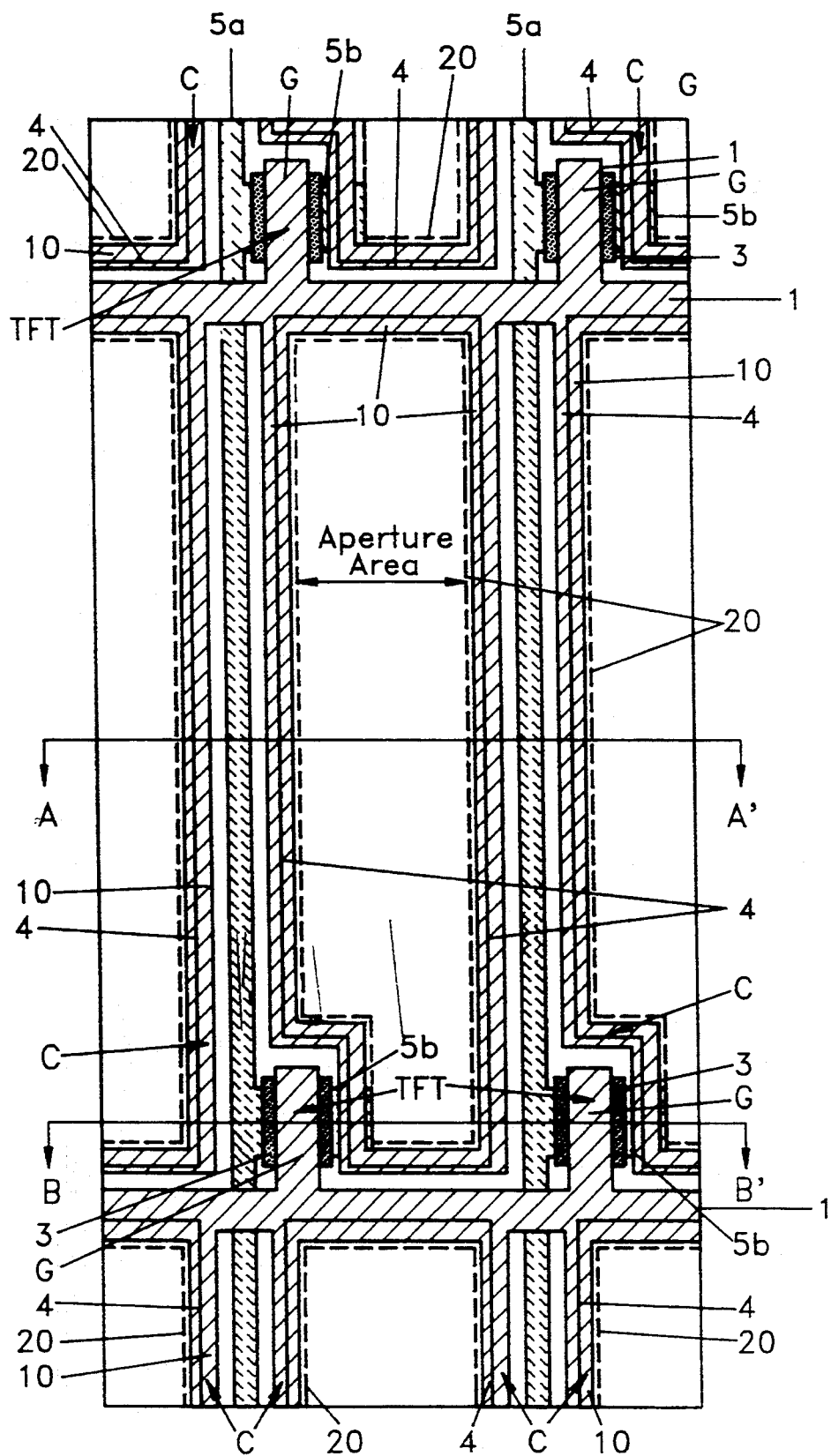
FIG. 2A is a fragmentary plan view depicting a preferred embodiment of an additional capacitor-type active matrix LCD constructed in accordance with the present invention.
Figure 2C:
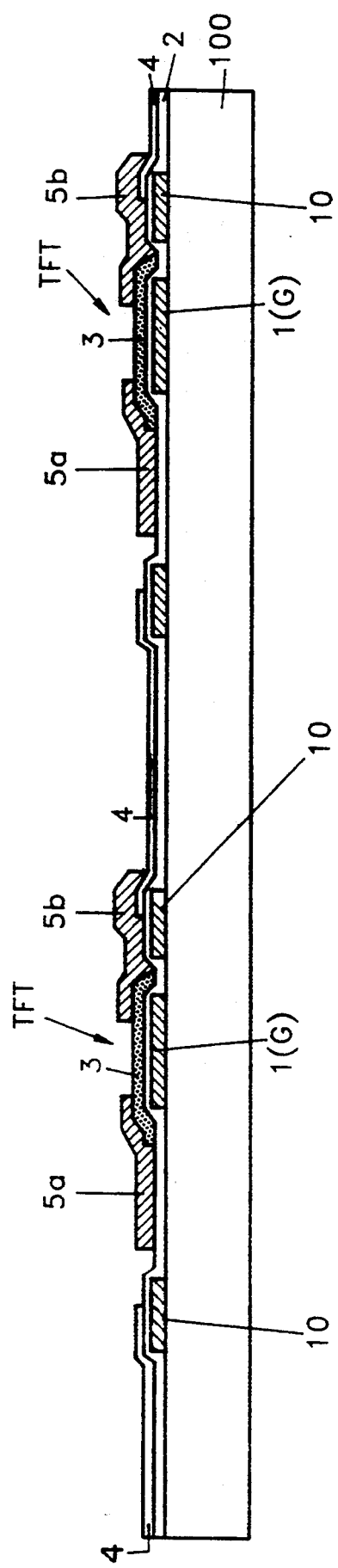
FIG. 2C is a cross-sectional view taken along the line B-B' of FIG. 2A.

With reference now to FIGS. 2A, 2B, and 2C, there can be seen an additional capacitor-type active matrix LCD constructed in accordance with the principles of the present invention. As can be readily understood by merely comparing FIGS. 1A and 2A, the active matrix LCD of the present invention is essentially constructed in the same manner as the prior art active matrix LCD depicted in FIGS. 1A and 1B, except that the layout of the first electrode 10 associated with each pixel electrode 4 is modified in such a manner as to significantly increase the aperture and contrast ratios relative to those of the aforesaid prior art active matrix LCD. More particularly, the opaque metal layer from which the scanning signal electrodes and the first electrodes 10 of the storage capacitors C are formed is patterned in a manner such that the first electrodes 10 of the storage capacitors C substantially surround their associated pixel electrodes 4, and preferably, only overlap a marginal edge portion of their associated pixel electrodes 4, around the periphery thereof. As can be seen more clearly in FIG. 2B, the first electrode 10 of each storage capacitor C is disposed substantially entirely beneath the black matrix light shield layer 20 provided on the inboard surface of the front glass substrate 101, and does not extend into the envelope of the Aperture Area, thereby significantly increasing the aperture ratio vis-a-vis that of the prior art active matrix LCD.

Additionally, with the first electrode 10 of each storage capacitor C being laid out in such a manner as to substantially surround each respective pixel electrode 4, the first electrode 10 of each storage capacitor C serves as an additional (i.e. in addition to the black matrix light shield layer 20) light shield layer, as is illustrated most clearly in FIG. 2B. More particularly, it is desirable to limit the light emitted through the Aperture Area of the front glass substrate 101, as much as possible, to only the light projected through the portion of the liquid crystal contained within the envelope of the Aperture Area and disposed above each pixel electrode 4. This goal is generally accomplished by minimizing the amount of extraneous (labelled "LEAK LIGHT") admitted through the Aperture Area of the front glass substrate 101 from regions of the liquid crystal located outside of the envelope of the Aperture Area.

In the case of the prior art active matrix LCD depicted in FIG. 1B, it can be seen that any extraneous light which strikes the front glass substrate 101 at an angle of incidence greater than $\theta_1$ is emitted through the Aperture Area of the front glass substrate 101. By comparison, in the case of the active matrix LCD of the present invention, as depicted in FIG. 2B, only extraneous light which strikes the front glass substrate 101 at an angle of incidence greater than $\theta_2$ is emitted through the Aperture Area of the front glass substrate 101. Any extraneous or Leak Light which strikes the front glass substrate 101 at less than the critical or capture angle of incidence $\theta_2$ is blocked by the first electrode 10 of the adjacent storage capacitor C. Thus, the present invention reduces the amount of Leak Light emitted through the Aperture Area of the front glass substrate 101 by an amount which is proportional to the difference ($\theta_2$-$\theta_1$), relative to the aforesaid prior art active matrix LCD, thereby significantly increasing the contrast ratio thereof, vis-a-vis that of said prior art active matrix LCD.

Yet further, as can be most clearly seen in FIG. 2C, in the present invention, an edge portion of each pixel electrode 4 preferably overlaps the first electrode 10 of its associated storage capacitor C by a predetermined width sufficient to ensure that the peripheral boundary of each pixel electrode 4 is formed on the same plane as the first electrode 10 of its associated storage capacitor C, without having to traverse an abrupt step. By contrast, with the prior art active matrix LCD, an abrupt step is necessarily formed at the boundary between each pixel electrode 4 and the distal edge of the first electrode 10 of its associated storage capacitor C. As such, problems such as attenuation or cracking of the pixel electrode pattern due to inadequate step coverage are inevitable, thereby resulting in decreased yield and increased manufacturing difficulties and costs. The present invention eliminates these problems.

Moreover, as is also most clearly illustrated in FIG. 2C, the source electrode 5b of each TFT overlaps the entire first electrode 10 of a respective one of the storage capacitors C, thereby eliminating the prior art problem of inferior step coverage of the source electrode 5b along the edge of the respective pixel electrode 4.

Although a preferred embodiment of the present invention has been described herein, it should be clearly understood that many variations and/or modifications of the basic inventive concepts herein taught which may appear to those skilled in the pertinent art will fall within the spirit and scope of the present invention, as defined in the appended claims.

What is claimed is:
1. A liquid crystal display, including:
   a front glass substrate having inboard and outboard surfaces;
   a rear glass substrate having inboard and outboard surfaces, and oriented in parallel, spaced-apart relation to said front glass substrate, with said inboard surfaces of said front and rear glass substrates facing each other;
   a plurality of rows of scanning signal electrodes and columns of display signal electrodes arranged in a matrix configuration on said inboard surface of said rear glass substrate, to thereby define a matrix of pixel regions, each of which is bounded by two adjacent ones of said rows of scanning signal electrodes and two adjacent ones of said columns of display signal electrodes;
   a pixel electrode disposed in each of said pixel regions;
   a switching element disposed in each of said pixel regions and connected between a respective one of said display signal electrodes and a respective one of said pixel electrodes;
   a storage capacitor disposed in each of said pixel regions, wherein each said storage capacitor includes a first electrode overlapping a marginal edge portion of a respective one of said pixel electrodes around the entire periphery thereof, whereby said first electrode is closed-ended;
   a black matrix light shield layer disposed on said inboard surface of said front glass substrate, said black matrix light shield layer being patterned in such a manner as to define a matrix of light transmissive apertures aligned with said matrix of pixel regions;
   a color filter layer disposed on said inboard surface of said front glass substrate and overlying said black matrix light shield layer, said color filter layer including light transmissive portions overlying said light transmissive apertures;
   a transparent electrode disposed over said color filter layer; and,
   a layer of liquid crystal sandwiched between said front glass substrate and said rear glass substrate.

2. The display as set forth in claim 1, further including a first protective layer interposed between said color filter layer and said transparent electrode.

3. The display as set forth in claim 1, wherein said first electrode of each said storage capacitor and said scanning signal electrodes lie in a common first plane, and said display signal electrodes and said pixel electrodes lie in a common second plane spaced from said first plane by an insulating layer disposed therebetween.

4. The display as set forth in claim 3, wherein each said switching element comprises a thin film transistor which includes:
   a gate electrode which comprises an integral tab-like portion of a respective one of said scanning signal electrodes;

a source electrode which comprises an integral tablike portion of a respective one of said display signal electrodes, said source electrode completely overlying said first electrode of a respective one of said storage capacitors;

a drain electrode which comprises said respective one of said display signal electrodes; and, a semiconductor layer disposed on said insulating layer and over said gate electrode, said semiconductor layer being patterned in such a manner as to interconnect said source electrode and said drain electrode.

5. The display as set forth in claim 4, wherein each said thin film transistor is disposed adjacent a corner of a respective one of said pixel regions, said corner being defined by the intersection of a respective one of said display signal electrodes with a respective one of said scanning signal electrodes.

6. The display as set forth in claim 1, wherein each said switching element is disposed adjacent a corner of a respective one of said pixel regions, said corner being defined by the intersection of a respective one of said display signal electrodes with a respective one of said scanning signal electrodes.

7. The display as set forth in claim 1, wherein the peripheral boundary of said apertures defined by edge portions of said black matrix light shield layer is aligned in substantial vertical registration with the inner, peripheral edge portion of said first electrode of respective ones of said storage capacitors, whereby said first electrodes of said respective ones of said storage capacitors function as additional light shield members for minimizing the amount of extraneous light allowed to be emitted through said apertures.

8. The display as set forth in claim 1, wherein the projection of each of said apertures through said rear glass substrate defines an imaginary aperture envelope, and, wherein further, said first electrode of respective ones of said storage capacitors do not extend into said imaginary aperture envelope.

9. The display as set forth in claim 1, wherein said first electrode of each said storage capacitor and each said scanning signal electrode are part of a common patterned layer.

10. The display as set forth in claim 9, wherein said common patterned layer is made of at least one opaque metal selected from the group comprised of aluminum, chromium, molybdenum and tantalum.

11. The display as set forth in claim 10, wherein each said switching element comprises a thin film transistor having a gate electrode which is also part of said common patterned layer.

12. A liquid crystal display, including:

a substrate;

a plurality of rows of scanning signal electrodes and columns of display signal electrodes arranged in a matrix configuration on a major surface of said substrate, to thereby define a matrix of pixel regions each of which is bounded by two adjacent ones of said rows of scanning signal electrodes and two adjacent ones of said columns of said display signal electrodes;

a pixel electrode disposed in each of said pixel regions;

a switching element disposed in each of said pixel regions and connected between a respective one of said display signal electrodes and a respective one of said pixel electrodes;

a storage capacitor disposed in each of said pixel regions, wherein each said storage capacitor includes a first electrode overlapping a marginal edge portion of a respective one of said pixel electrodes around the entire periphery thereby, whereby said first electrode is closed-ended.

13. The display as set forth in claim 12, wherein said first electrode of each said storage capacitor and said scanning signal electrodes lie in a common first plane, and said display signal electrodes and said pixel electrodes lie in a common second plane spaced from said first plane by an insulating layer disposed therebetween.

* * * * *